United States Patent
Jiménez et al.

(10) Patent No.: US 9,712,467 B2
(45) Date of Patent: Jul. 18, 2017

(54) ITERATIVE METHOD TO SUCCESSFULLY SEND LARGE ELECTRONIC MESSAGES

(71) Applicant: International Business Machines Corporation, Armonk, NY (US)

(72) Inventors: Oscar Durán Jiménez, Jalisco (MX); José Eduardo Martinez Cordero, Ciudad Nezahualcoyotl (MX); Maharaj Mukherjee, Poughkeepsie, NY (US); Gabriel Vallarta, Jalisco (MX)

(73) Assignee: International Business Machines Corporation, Armonk, NY (US)

( * ) Notice: Subject to any disclaimer, the term of this patent is extended or adjusted under 35 U.S.C. 154(b) by 365 days.

(21) Appl. No.: 14/193,153

(22) Filed: Feb. 28, 2014

(65) Prior Publication Data
US 2015/0249627 A1    Sep. 3, 2015

(51) Int. Cl.
*G06F 15/16* (2006.01)
*H04L 12/58* (2006.01)
*G06Q 10/10* (2012.01)

(52) U.S. Cl.
CPC ......... *H04L 51/066* (2013.01); *G06Q 10/107* (2013.01); *H04L 12/585* (2013.01)

(58) Field of Classification Search
CPC ..... G06Q 10/107; H04L 12/585; H04L 12/58; H04L 12/581; H04L 12/5855; H04L 29/06; H04L 26/0653; H04L 49/90; H04L 29/08072; H04L 29/06095
USPC .......................................................... 709/206
See application file for complete search history.

(56) References Cited

U.S. PATENT DOCUMENTS

| | | | | |
|---|---|---|---|---|
| 6,594,699 B1* | 7/2003 | Sahai | ............... | H04L 29/06027 709/228 |
| 6,823,365 B1* | 11/2004 | Mattis | ............... | G06Q 10/107 709/206 |
| 7,003,497 B2* | 2/2006 | Maes | ............... | G06Q 20/04 705/64 |
| 7,437,416 B2* | 10/2008 | Enatsu | ............... | H04L 12/585 709/203 |

(Continued)

FOREIGN PATENT DOCUMENTS

EP    1085436 A2    3/2001

OTHER PUBLICATIONS

Internet Society; Abel, "Internationalized Email Headers," IPCOM000174392D (Sep. 6, 2008).

(Continued)

*Primary Examiner* — Mahran Abu Roumi
(74) *Attorney, Agent, or Firm* — Kurt P. Goudy; Michael J. Chang, LLC (57) ABSTRACT

Iterative techniques for successfully sending large electronic messages are provided. In one aspect, a method of sending an electronic message is provided. The method includes the steps of: transmitting the electronic message from a sender to a recipient, wherein a size of the electronic message exceeds an electronic message size limit for the recipient; receiving a message from the recipient that the size of the electronic message exceeds the electronic message size limit for the recipient; automatically dividing the electronic message into at least two segments; and transmitting the at least two segments to the recipient. Additionally, the recipient's preferences for receiving large electronic messages from the sender may also be taken into account.

17 Claims, 3 Drawing Sheets

(56) References Cited

U.S. PATENT DOCUMENTS

| | | | | |
|---|---|---|---|---|
| 7,756,929 B1* | 7/2010 | Pettigrew | G06Q 10/107 | 709/206 |
| 7,912,187 B1* | 3/2011 | Mikan | H04L 12/5815 | 379/88.14 |
| 7,996,025 B2* | 8/2011 | Lee | G06Q 10/10 | 455/466 |
| 8,284,940 B2* | 10/2012 | Park | H04L 63/0428 | 380/270 |
| 8,509,399 B2* | 8/2013 | Shaw | H04W 4/18 | 379/88.23 |
| 8,831,569 B2* | 9/2014 | Brown | H04L 9/3247 | 455/411 |
| 9,143,534 B1* | 9/2015 | Kelliher | H04L 51/10 | |
| 2001/0013056 A1* | 8/2001 | Mori | H04L 12/5835 | 709/206 |
| 2001/0044903 A1* | 11/2001 | Yamamoto | H04L 63/02 | 726/26 |
| 2002/0087549 A1* | 7/2002 | Mostafa | H04L 12/587 | |
| 2002/0147778 A1* | 10/2002 | Dutta | H04L 51/26 | 709/206 |
| 2003/0115488 A1* | 6/2003 | Kunito | H04L 63/08 | 726/4 |
| 2004/0111476 A1* | 6/2004 | Trossen | H04W 4/12 | 709/206 |
| 2005/0111631 A1* | 5/2005 | Jordan | H04L 12/5835 | 379/88.12 |
| 2005/0188026 A1* | 8/2005 | Hilbert | H04L 12/58 | 709/206 |
| 2005/0192966 A1* | 9/2005 | Hilbert | G06F 17/30067 | |
| 2006/0274728 A1* | 12/2006 | Leppisaari | H04L 12/581 | 370/352 |
| 2007/0118602 A1* | 5/2007 | Heinla | H04L 51/22 | 709/206 |
| 2007/0203992 A1* | 8/2007 | Coskun | G06Q 10/107 | 709/206 |
| 2007/0288564 A1* | 12/2007 | Rooke | G06Q 10/107 | 709/204 |
| 2008/0126489 A1* | 5/2008 | Potluri | H04L 51/00 | 709/206 |
| 2009/0113001 A1* | 4/2009 | Manning | H04L 51/12 | 709/206 |
| 2010/0274856 A1* | 10/2010 | Bhadriraju | G06Q 10/107 | 709/206 |
| 2012/0036196 A1* | 2/2012 | Patel | G06Q 10/107 | 709/206 |
| 2012/0155459 A1* | 6/2012 | Bouthemy | H04L 51/04 | 370/389 |
| 2013/0023287 A1* | 1/2013 | Shaw | H04W 4/18 | 455/456.1 |
| 2013/0260802 A1* | 10/2013 | Mayblum | H04L 4/14 | 455/466 |
| 2014/0122630 A1* | 5/2014 | Trossen | H04W 4/12 | 709/206 |
| 2014/0164534 A1* | 6/2014 | Fushman | H04L 67/06 | 709/206 |
| 2014/0274055 A1* | 9/2014 | Sriram | H04W 36/0083 | 455/436 |

OTHER PUBLICATIONS

IBM, "Pervasive Messaging Support to Communication and Computational Applications," IPCOM000015708D (Jun. 21, 2003).

Internet Society; Allman et al., "SMTP Service Extension for Indicating the Responsible Submitter of an E-Mail Message," IPCOM000135963D (Apr. 29, 2006).

* cited by examiner

ITERATIVE METHOD TO SUCCESSFULLY SEND LARGE ELECTRONIC MESSAGES

FIELD OF THE INVENTION

The present invention relates to sending electronic messages (e.g., electronic mail (email), text messages, images, video, postings, etc.) and more particularly, to iterative techniques for successfully sending large electronic messages.

BACKGROUND OF THE INVENTION

Electronic messaging systems typically impose limitations on the size of the messages their users can receive. For instance, electronic mail or email systems typically have limitations imposed on the size of the files the system can receive. The same is also often true for the receipt of image/video files, text messages, etc. Basically, if the message is too large, it cannot be transmitted. When a sender attempts to send an electronic message that is larger than the size limit set for the recipient, the message is dropped. An error message may be returned to the sender indicating that the message could not be delivered.

Techniques for addressing this situation have been proposed, for example, in U.S. Patent Application Publication Number 2001/0013056 filed by Mori et al., entitled "Information Processor Having Electronic Mail Function and Recording Medium Storing Electronic Mail Processing Program" (hereinafter "Mori") wherein large email messages are sent by automatically dividing the sent mail into a number of sub-mail sections. The process described in Mori, however, requires that the size limitations of the recipient be known a priori. To do so, an inquiry has to be made about the recipient's policy beforehand which is time consuming and increases network traffic since this task has to be performed for each recipient as size limitations vary.

Accordingly, improved techniques for successfully sending large electronic messages would be desirable.

SUMMARY OF THE INVENTION

The present invention provides iterative techniques for successfully sending large electronic messages (e.g., electronic mail (email), text messages, images, video, postings, etc.). In one aspect of the invention, a method of sending an electronic message is provided. The method includes the steps of: transmitting the electronic message from a sender to a recipient, wherein a size of the electronic message exceeds an electronic message size limit for the recipient; receiving a message from the recipient that the size of the electronic message exceeds the electronic message size limit for the recipient; automatically dividing the electronic message into at least two segments; and transmitting the at least two segments to the recipient.

In another aspect of the invention, another method of sending an electronic message is provided. The method includes the steps of: transmitting the electronic message from a sender to a recipient, wherein a size of the electronic message exceeds an electronic message size limit for the recipient; receiving a message from the recipient that the size of the electronic message exceeds the electronic message size limit for the recipient; inquiring as to a preference of the recipient for receiving electronic messages from the sender wherein the size of the electronic message exceeds the electronic message size limit for the recipient; and automatically dividing the electronic message into at least two segments and transmitting the at least two segments to the recipient if doing so conforms with the preference of the recipient, otherwise dropping the electronic message.

A more complete understanding of the present invention, as well as further features and advantages of the present invention, will be obtained by reference to the following detailed description and drawings.

DETAILED DESCRIPTION OF PREFERRED EMBODIMENTS

Provided herein are techniques for successfully sending large electronic messages without a priori knowing and/or without making any assumptions about the recipient's electronic message size limitations. Thus, the present techniques conform with current electronic message server requirements and do not require that additional inquiries be made as to size limitations, etc. The term "electronic message(s)" (or simply 'message(s)'), as used herein generally refers to any type of communication that can be transmitted from a sender to a recipient electronically via a network, such as the internet. By way of example only, electronic messages which can be processed by way of the present techniques include, but are not limited to, electronic mail (email) messages, text messages, image messages, video messages, postings (e.g., those on social media sites), etc. All of these 'electronic message' communications between a sender and recipient typically have size limitations imposed thereon (see below).

Specifically, the present techniques involve an intelligent process for acquiring the size requirements of a plurality of recipients through an iterative learning process, based on which large electronic messages (i.e., those exceeding the recipient's message size limit) can be broken up into multiple, appropriately sized files and successfully transmitted. Once known, the size limitations can be implemented in subsequent transmissions to a given recipient.

As will be described in detail below, alternative embodiments of the present techniques include an acceptance rule, which further takes into account a recipient's preferences. For example, upon the sender receiving a notification that his/her message has been dropped due to its large size, the intended recipient is given a choice as to whether (or not) to receive the (large) message, and if so, whether the recipient would like to receive the message (via the present process) just this one time, or every time the sender sends the recipient a (large) message.

Throughout the description, the terms "sender" and "recipient" will be used to refer to a user sending and a user receiving an electronic message (or simply "message"), respectively. The terms "recipient" and "receiver" may also be used synonymously herein.

The size limitations on electronic messages (e.g., specified in bytes) is typically set by the system provider. For instance, with regard to email, some Internet-based email providers may set a limit of 10 MB, or 20 MB per message. This is done to prevent bottlenecks in the network. Attachments to an email message, such as image or media files, can cause the message to greatly exceed these preset limits. The same such limitations are also typically imposed on text messages, postings on social media, etc. For instance, text messages are generally limited to a certain maximum number of characters (e.g., 160 characters). This is in part due to bandwidth constraints in wireless networks. Similarly, postings to social media sites, such as Twitter, are limited to a certain maximum number of characters for each post.

Electronic messages (e.g., email, text messages, image messages, video messages, postings on social media sites, etc.) are generally transferred via the Internet as a string of data packets. Namely, a given message is typically broken down by the network into multiple data packets each of a certain size, and the data packets are transmitted from the sender to the recipient. Depending on the communication methods and message types, data packets can be of different types such as: voice, video, image or data. They can be also communicated asynchronously, or synchronously in real-time. Normally data packets are of a fixed size depending on the communication protocol and the type of message. They are aggregated at the recipient's end and presented to the recipient. When the aggregated size of the data packets for a message exceeds the recipient's size limit, the message is dropped. The present techniques leverage the notion that the aggregation of the data packets can be configured in accordance with given network requirements. For instance, a message can be broken into different parts or segments each containing a different number of data packets. These different parts or segments of messages are also referred to herein as "segments of the message," "message segments" or simply "segments."

Figure 1:
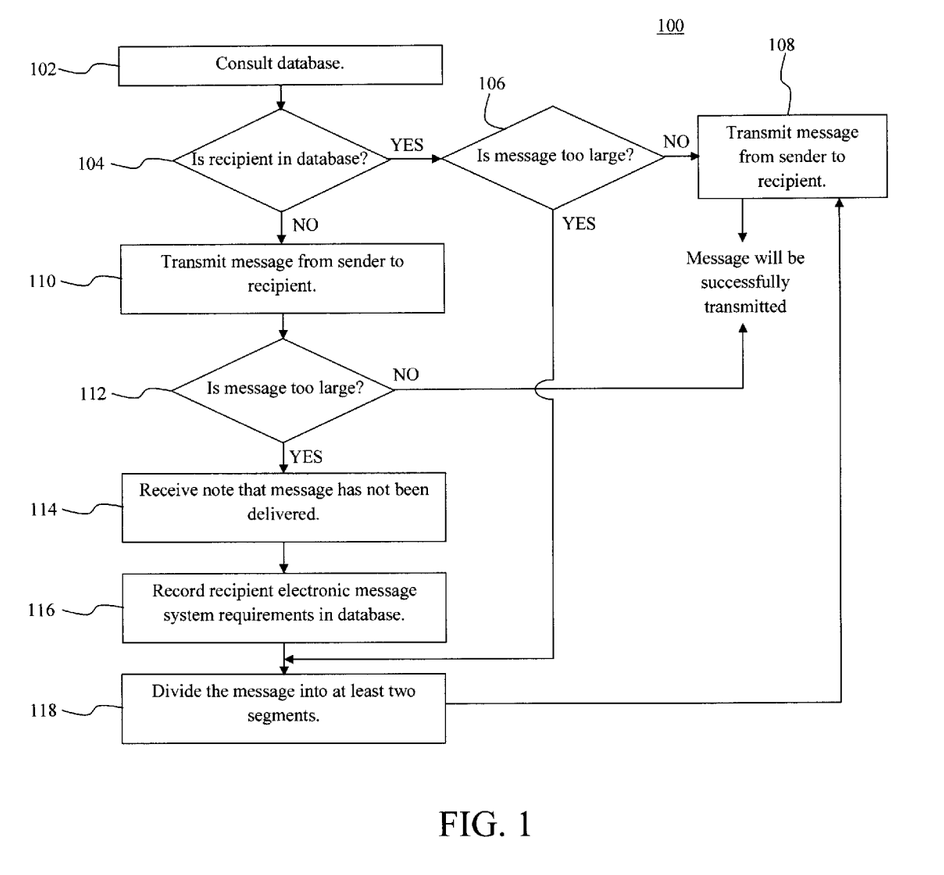
FIG. 1 is a diagram illustrating an exemplary methodology for sending an electronic message according to an embodiment of the present invention.

FIG. 1 is a diagram illustrating exemplary methodology 100 for sending an electronic message such as an email, text messages, image messages, video messages, postings on social media sites, etc. It is assumed in this scenario that the sender wishes to send an electronic message (of a certain size—as described above) to a given recipient. As further described above, without a priori knowledge of a recipient's system requirements, the present techniques provide an iterative process by which the recipient's electronic message size limitations are learned, and by dividing up an electronic message into suitable size segments achieve successful transmittal of the message.

As will be described in further detail below, once the present process learns the recipient's system requirements, this data can be stored in a database for future reference. Thus, in step 102, the process begins by first consulting the database to see whether it contains electronic message size requirements for this particular recipient. In step 104, a determination is made as to whether (or not) the given recipient is already in the database. This presupposes that the sender has previously sent a message to this particular recipient and, by way of the present process, was able to deduce the recipient's message size limitations. It is also possible that the sender and/or a system administrator having knowledge of recipient's system requirements can also update the database.

If the recipient system's electronic message size requirements are already in the database, then in step 106 a determination is made as to whether (or not) the size of the message to be sent is less than the recipients' message size limit. If the message is under the recipient's size limit requirements, then the message is transmitted from the sender to the recipient in step 108 and, at least with regard to message size limitations, the message should be successfully transmitted from sender to recipient.

On the other hand, if the message exceeds the recipient's size limit requirements, then the message is automatically divided into at least two segments (step 118). One benefit in this particular scenario is that the recipient's message size limitations are known (i.e., have been learned through the present iterative process—see below). Therefore, in that case, the message can be broken down into multiple segments, each of which is under the size limits for the recipient—thus insuring that the message can be successfully transmitted from sender to recipient.

It is likely, for instance if the sender has not previously sent a message to this particular recipient, that the recipient's electronic message system requirements are not yet in the database. In that case, an attempt is made in step 110 to transmit the message from the sender to the recipient. Whether or not the message will be successfully transmitted will depend on the size limit requirements of the recipient's system. Namely, in step 112, a determination is made, based on the recipient's system requirements, as to whether a size of the message exceeds the recipient's electronic message size limitation, i.e., is the message too large. As provided above, electronic message size requirements are typically imposed by Internet-based service providers and set a limit (e.g., in bytes) on a size of an electronic message that users can receive. Thus, using the above example involving email, if in step 110 the sender sends the recipient an email that is 5 MB in size and the recipient's system has a 10 MB limit, then the size of the message is below the limit. In that case, as shown in FIG. 1, at least with regard to message size limitations, the message will be successfully transmitted from the sender to the recipient. Optionally, the size of the message that was successfully sent to this recipient may be recorded in the database (not shown). That way, when the database is consulted (step 104) for subsequent messages to this particular recipient, it can be ascertained that a message at least as large as this one is less than the recipient's size limits. Further, the database can be updated whenever additional information is garnered. For instance, using this particular example, it may be later learned (by way of the present teachings) that the recipient's electronic message size limits are even greater than the message that was successfully sent, and that information can be logged into the database.

If, on the other hand, it is determined in step 112 that the message exceeds the recipient's message size limitations (i.e., the message is too large), then the recipient's system will drop the electronic message and return a message that the email, text message, etc. has not been delivered. This message from the recipient is received by the sender in step 114. The message from the recipient will typically contain a notification that the message was dropped because it exceeds the size limit, and also will give specifics on what the size requirements are for the recipient's system. In that case, as per step 116, the size limit information for the recipient is recorded in the database.

It is notable that even if the message returned from the recipient when a message is dropped does not contain the recipient's electronic message size requirements, the present process has nevertheless produced important and useful information. Specifically, it is now known that the recipient's electronic message size limit is less than the size of the message. This information can be recorded in the database until more definitive information can be obtained/learned. For instance, if the message is 10 MB in size, and is dropped, then it may be recorded in the database that the recipient's size limit is less than 10 MB. If in subsequent iterations of the process the message is broken up into smaller size segments which are successfully transmitted, then it has been learned that the recipient's email size limit falls somewhere between 10 MB and the size of the segments.

Based on the recipient's system (electronic message size) requirements, in step 118, the message is divided into at least two segments. Each of the segments will be of a size that is less than the recipient's message size limit. Thus, the number of segments (into which the message is divided) will depend on the size of the message and the recipient's electronic message size limit. Using a simple example, if the recipient can receive messages less than or equal to about 5 MB in size, then a 10 MB electronic message may be divided up into two 5 MB segments. A 20 MB electronic message may be divided up into four 5 MB segments, and so on. The segments can then be transmitted as per step 108 and, at least with regard to message size limitations, the message should be successfully transmitted from sender to recipient. The next time the sender wants to send an electronic message to the given recipient, the database can be consulted (as described above) and emails that exceed the size limits are automatically divided into acceptable sized segments.

The method described in accordance with FIG. 1, above, operates without substantive feedback from the recipient other than the size limits their system imposes and whether or not an electronic message exceeds that limit. An alternative embodiment, based on the above concepts, is also provided herein which further takes into account the recipient's preferences with regard to receiving large sized electronic messages from the sender. For instance, as will be described in detail below, the recipient may be queried as to whether he/she would like to receive large messages from the sender (divided into segments in accordance with the present techniques) in the future, or only this one time.

Take for instance the case where a recipient has limited storage capacity and therefore generally does not want to receive large files electronically. Therefore, having a size limit imposed on electronic messages by the recipient's system is desirable. Say, however, that the recipient needs an image file for a presentation at work and the easiest and quickest way for the sender to get it to him is through email. The recipient would like the email with the image file attachment (which exceeds his system's size limits) to go through this one time—for which the present techniques may be implemented. However, the recipient does not wish to receive large files (emails or otherwise) from the sender in the future. In that case, the present techniques can impose an acceptance rule that reflects the recipient's preferences. As will be described in detail below, the recipient's preferences may be acquired by sending the recipient an inquiry message whenever a large message to the recipient is dropped. Alternatively, the recipient might instead decide that he/she always wants to receive large electronic messages from the sender. Accordingly, this preference can be embodied in an acceptance rule that dictates that the present techniques be employed every time a large message is sent from the sender to the recipient.

Figure 2:
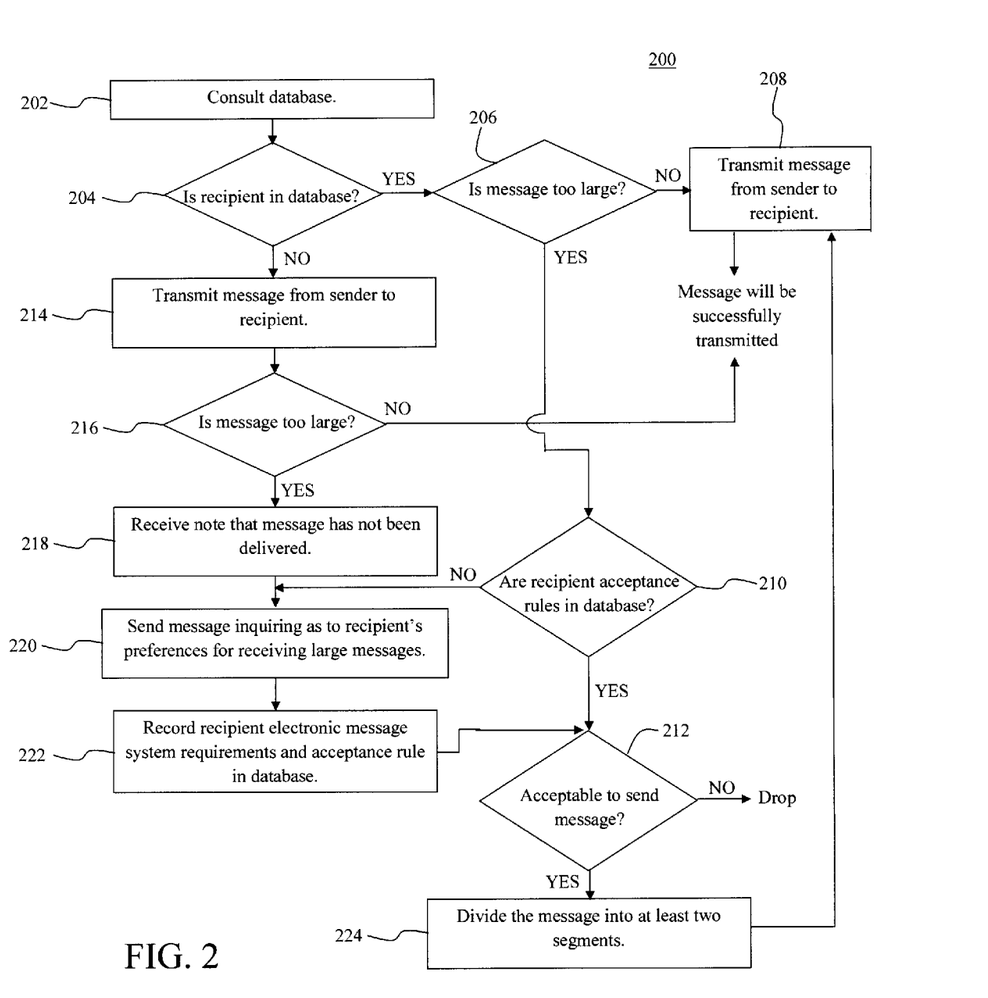
FIG. 2 is a diagram illustrating an exemplary methodology for sending an electronic message which takes into account recipient preferences according to an embodiment of the present invention.

An exemplary embodiment incorporating acceptance rules is now described by way of reference to FIG. 2. FIG. 2 provides an alternative methodology 200 for sending an electronic message such as an email, text messages, image messages, video messages, postings on social media sites, etc. which takes recipient preferences into account. It is assumed in this scenario that the sender wishes to send an electronic message (of a certain size—as described above) to a given recipient.

As described above, and in further detail below, the present process involves learning the recipient's system requirements and in this example also the recipient's preferences with regard to receiving large messages (embodied here in one or more 'acceptance rules'). This data can be stored in a database for future reference.

Thus, in step 202, the process begins by first consulting the database to see whether (or not) it contains data related to this particular recipient. The data may include email size requirements for the recipient and/or acceptance rules regarding the recipient's preferences for receiving large electronic messages. For instance, the process will generally operate to automatically determine/learn the system size limits for incoming electronic messages so as to be able to send large messages to the recipient. In that regard, the process will be carried out in the same manner as described in conjunction with the description of FIG. 1, above. In this example, however, an inquiry will be made as to the recipient's preferences for receiving large messages. It may be the case that the recipient does not provide a preference, and thus data relating the acceptance rules for the recipient would not be present.

In step 204, a determination is made as to whether (or not) the given recipient is already in the database. For data regarding a particular recipient to be present in the database at this stage in the process presupposes that the sender has previously sent a message to this particular recipient and, by way of the present process, was able to acquire/determine/learn data regarding the recipient. Again, it is also possible that the sender and/or a system administrator having knowledge of the recipient system requirements and/or preferences can also contribute to the database.

If data regarding the recipient's system requirements for incoming message size limitations is already in the database, then in step 206 a determination is made as to whether (or not) the size of the message to be sent is less than the recipients' message size limit. If the message is under the recipient's size limit requirements, then the message is transmitted from the sender to the recipient in step 208 and, at least with regard to message size limitations, the message should be successfully transmitted from sender to recipient.

On the other hand, if the message exceeds the recipient's size limit requirements (based on data for the recipient recorded in the database), then in step 210, a determination is made as to whether (or not) data regarding the recipient's preferences for receiving large electronic messages (i.e., those which exceed the system limits) are present in the database. As highlighted above, according to an exemplary embodiment, the recipient's preferences for receiving large electronic messages are embodied in one or more 'acceptance rules' which specify whether, e.g., the recipient wishes to 1) always receive large electronic messages from the sender or 2) only receive a large electronic message from the sender this one time—a one shot deal. As above, for the data regarding a particular recipient to be present in the database at this stage in the process presupposes that the sender has previously sent a message to this particular recipient and, by way of the present process, was able to acquire/determine/learn data regarding the recipient.

The acceptance rules can be acquired by way of an inquiry sent to the recipient when a large message is dropped and/or (as in this case) where there are no acceptance rules yet in place for the recipient. Namely, if the inquiry at step 210 reveals that there are no acceptance rules in place for the given recipient, then (as per step 220—see below) a message can be sent to the recipient inquiring as to his/her preferences when a large electronic message is being sent. The message can then be handled accordingly.

On the other hand, if it is determined in step 210 that there are acceptance rules in place in the database for the given recipient, then as per step 212, a determination is made as to whether—given the acceptance rules in place—whether (or not) it is acceptable to send the large message (i.e., using the present iterative process to automatically divide it into smaller segments). Using the above acceptance rules as an illustrative, non-limiting example, if the first rule (rule (1)) is in place for the given recipient and he/she wishes to always receive large electronic messages from the sender, then the process proceeds to divide the message into smaller sized segments to permit successful transmission from sender to recipient. On the other hand, if the second rule (rule (2)) is in place for the given recipient and he/she wishes to receive a large electronic message from the sender only once (a one shot deal), then this means that for any subsequent attempts (such as this) the message should be dropped.

Referring back to step 204, if there is no data in the database with regard to this particular recipient (e.g., the sender has not previously sent the recipient a large electronic message), then an attempt is made in step 214 to transmit the message from the sender to the recipient. Whether or not the message will be successfully transmitted will depend on the size limit requirements of the recipient's system (which in this case is not yet known). In step 216, a determination is made, based on the recipient's system requirements, as to whether a size of the message exceeds the recipient's size limitation, i.e., is the message too large? If the size of the message is less than the size limits imposed by the recipient's system then, at least with regard to message size limitations, the message will be successfully transmitted from the sender to the recipient.

Optionally, the size of the message that was in this case successfully sent to this recipient may be recorded in the database (not shown). That way, when the database is consulted (step 204) for subsequent messages to this particular recipient, it can be ascertained that a message at least as large as this one does not exceed the recipient's size limits. Further, the database can be updated whenever additional information is obtained. For instance, using this particular example, it may be later learned (by way of the present teachings) that the recipient's message size limits are even greater than the message that was successfully sent, and that information can be logged into the database.

On the other hand, if it is determined in step 216 that the message exceeds the recipient's message size limitations (i.e., the message is too large), then the recipient's system will drop the message and return a note that the message has not been delivered. This message from the recipient is received by the sender in step 218. As provided above, the message from the recipient will typically contain a notification that the message was dropped because it exceeds the size limit, and also will give specifics on what the size requirements are for the recipient's system. As described below, this size limit information (as well as any data related to the recipient's preferences for receiving large messages, i.e., 'acceptance rules') will be recorded in the database (see description of step 222, below).

However, even if the message returned from the recipient when a message is dropped does not contain the size requirements imposed by the recipient's system, the present process has nevertheless garnered useful information. Specifically, it is now known that the recipient's incoming message size limit is less than the size of the message. This information can be recorded in the database until more definitive information can be obtained/learned.

As provided above, in this exemplary embodiment, further measures are taken to obtain the recipient's preferences for receiving large messages from the sender (embodied in one or more acceptance rules). Thus, as per step 220, when a large message (i.e., one which exceeds the recipient's incoming message size limitations) is involved, a message is sent to the recipient inquiring as to the recipient's preferences for receiving large messages. According to an exemplary embodiment, the recipient is asked first whether he/she would like to receive large electronic messages from the sender, and if so, second, whether he/she would like to 1) receive large electronic messages from the sender every time they are sent, or 2) only this one time (a one shot deal).

In step 222, the size limit information for the recipient (see step 218, described above) and the recipient's preference for receiving large messages (see step 222, described above) are recorded in the database. In the case where the recipient has not responded to the inquiry as to his/her preferences for receiving large messages from the sender (see step 220), by way of example only, several options exist. One option is simply to stall any further action until the recipient responds to the inquiry. Further, one or more follow-up inquiries may be made after a certain amount of time has elapsed without a response from the recipient. Another option is to wait a predetermined amount of time and, if there is no response, then the large message can be dropped. Yet another possible option is to wait a predetermined amount of time and, if there is no response, then the message can be divided and sent in accordance with the present techniques. Combinations of these options are also possible. For instance, after one or more follow-up inquiries, the large message can be dropped or sent.

The recipient's preferences are recorded in the database as an acceptance rule(s). These rules are then consulted as described in conjunction with the description of step 212, above. Namely, a determination is made in step 212, as per the acceptance rules recorded in the database for the recipient, whether or not it is acceptable to proceed with sending the large message to the recipient. For instance, if the recipient indicates that he/she does not want to receive any large messages from the sender, then the large message is dropped.

On the other hand, the recipient might authorize the large message this one time, and in that case, the process for dividing up and transmitting the message (see steps 224 and 208) can be carried out. The same situation would apply where the recipient has indicated that all large messages from the sender should be permitted.

Assuming that the recipient's preferences authorize that the large messages be sent (or in the example provided above where the recipient is non-responsive as to his/her preferences), based on the recipient's system requirements, in step 224, the message is divided into at least two segments. Each of the segments will be of a size that is less than the recipient's incoming message size limit. Thus, the number of segments (into which the message is divided) will depend on the size of the message and the recipient's incoming message size limit. The segments can then be transmitted as per step 208 and, at least with regard to message size limitations, the message should be successfully transmitted from sender to recipient. The next time the sender wants to send a message to the given recipient, the database can be consulted (as described above) and, provided that the acceptance rules permit, messages that exceed the size limits are automatically divided into acceptable sized segments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
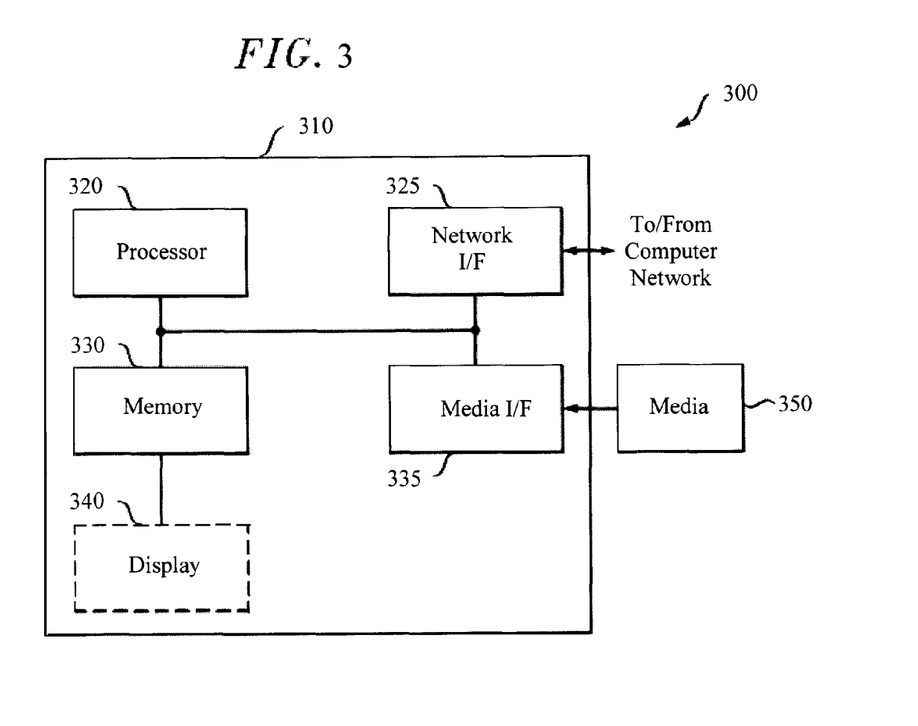
FIG. 3 is a diagram illustrating an exemplary apparatus for performing one or more of the methodologies presented herein according to an embodiment of the present invention.

Turning now to FIG. 3, a block diagram is shown of an apparatus 300 for implementing one or more of the methodologies presented herein. By way of example only, apparatus 300 can be configured to implement one or more of the steps of methodology 100 of FIG. 1 and/or methodology 200 for sending a large electronic message (e.g., an email, a text message, an image message, a video message, etc.).

Apparatus 300 includes a computer system 310 and removable media 350. Computer system 310 includes a processor device 320, a network interface 325, a memory 330, a media interface 335 and an optional display 340. Network interface 325 allows computer system 310 to connect to a network, while media interface 335 allows computer system 310 to interact with media, such as a hard drive or removable media 350.

Processor device 320 can be configured to implement the methods, steps, and functions disclosed herein. The memory 330 could be distributed or local and the processor device 320 could be distributed or singular. The memory 330 could be implemented as an electrical, magnetic or optical memory, or any combination of these or other types of storage devices. Moreover, the term "memory" should be construed broadly enough to encompass any information able to be read from, or written to, an address in the addressable space accessed by processor device 320. With this definition, information on a network, accessible through network interface 325, is still within memory 330 because the processor device 320 can retrieve the information from the network. It should be noted that each distributed processor that makes up processor device 320 generally contains its own addressable memory space. It should also be noted that some or all of computer system 310 can be incorporated into an application-specific or general-use integrated circuit.

Optional display 340 is any type of display suitable for interacting with a human user of apparatus 300. Generally, display 340 is a computer monitor or other similar display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method of sending an electronic message, comprising the steps of:
    transmitting the electronic message from a sender to a recipient, wherein a size of the electronic message exceeds an electronic message size limit for the recipient;
    receiving a message from the recipient that the size of the electronic message exceeds the electronic message size limit for the recipient;
    establishing an acceptance rule for the recipient, wherein the acceptance rule includes whether the recipient wants to receive electronic messages from the sender that exceed the electronic message size limit for the recipient just one time or every time the sender sends an electronic message to the recipient that exceeds the electronic message size limit for the recipient, and associating the acceptance rule with the recipient;
    consulting the acceptance rule for the recipient prior to further transmissions from the sender to the recipient;
    automatically dividing the electronic message into at least two segments, each of which has a size that is less than the electronic message size limit for the recipient; and
    transmitting the at least two segments to the recipient only if doing so conforms with the acceptance rule for the recipient, thereby permitting electronic messages that exceed the electronic message size limit for the recipient to be successfully sent to the recipient.

2. The method of claim 1, wherein the electronic message comprises one or more of an electronic mail (email) message, a text message, an image message, and a video message.

3. The method of claim 1, wherein the message from the recipient that the size of the electronic message exceeds the electronic message size limit for the recipient contains the electronic message size limit for the recipient, and wherein the electronic message is automatically divided into the at least two segments, each of which having a size that is less than the electronic message size limit for the recipient.

4. The method of claim 2, further comprising the step of:
    recording the electronic message size limit for the recipient in a database.

5. The method of claim 4, further comprising the steps of:
    consulting the database prior to transmitting the electronic message from the sender to the recipient; and
    automatically dividing the electronic message into the at least two segments, each of which having a size that is less than the electronic message size limit for the recipient recorded in the database.

6. A method of sending an electronic message, comprising the steps of:
    transmitting the electronic message from a sender to a recipient, wherein a size of the electronic message exceeds an electronic message size limit for the recipient;
    receiving a message from the recipient that the size of the electronic message exceeds the electronic message size limit for the recipient;
    inquiring as to a preference of the recipient for receiving electronic messages from the sender wherein the size of the electronic message exceeds the electronic message size limit for the recipient by sending a message to the recipient inquiring as to the preference of the recipient for receiving electronic messages from the sender when the size of the electronic message exceeds the electronic message size limit for the recipient;
    recording i) the electronic message size limit for the recipient and ii) the preference of the recipient for receiving electronic messages from the sender wherein the size of the electronic message exceeds the electronic message size limit for the recipient in a database;
    establishing an acceptance rule for the recipient, wherein the acceptance rule includes whether the recipient wants to receive electronic messages from the sender that exceed the electronic message size limit for the recipient and, if so, whether the recipient wants to receive electronic messages from the sender that exceed the electronic message size limit for the recipient just one time or every time the sender sends an electronic message to the recipient that exceeds the electronic message size limit for the recipient, and associating the acceptance rule with the recipient; and
    consulting the database prior to transmitting the electronic message from the sender to the recipient; and
    automatically dividing the electronic message into at least two segments, each of which having a size that is less than the electronic message size limit for the recipient recorded in the database and transmitting the at least two segments to the recipient if doing so conforms with the preference of the recipient thereby permitting electronic messages that exceed the electronic message size limit for the recipient to be successfully sent to the recipient, otherwise dropping the electronic message.

7. The method of claim 6, wherein the message from the recipient that the size of the electronic message exceeds the electronic message size limit for the recipient contains the electronic message size limit for the recipient, and wherein the electronic message is automatically divided into the at least two segments, each of which having a size that is less than the electronic message size limit for the recipient.

8. The method of claim 6, wherein the message sent to the recipient inquiring as to the preference of the recipient provides the recipient with an option i) to receive or ii) not to receive electronic messages from the sender when the size of the electronic message exceeds the electronic message size limit for the recipient.

9. The method of claim 6, wherein the message sent to the recipient inquiring as to the preference of the recipient provides the recipient with an option to receive electronic messages from the sender when the size of the electronic message exceeds the electronic message size limit for the recipient either i) one time or ii) every time.

10. An apparatus for sending an electronic message, the apparatus comprising:
    a memory; and
    at least one processor device, coupled to the memory, operative to:
        transmit the electronic message from a sender to a recipient, wherein a size of the electronic message exceeds an electronic message size limit for the recipient;
        receive a message from the recipient that the size of the electronic message exceeds the electronic message size limit for the recipient;
        establish an acceptance rule for the recipient, wherein the acceptance rule includes whether the recipient wants to receive electronic messages from the sender that exceed the electronic message size limit for the recipient just one time or every time the sender sends an electronic message to the recipient that exceeds the electronic message size limit for the recipient, and associating the acceptance rule with the recipient;
        consult the acceptance rule for the recipient prior to further transmissions from the sender to the recipient;
        automatically divide the electronic message into at least two segments, each of which has a size that is less than the electronic message size limit for the recipient; and
        transmit the at least two segments to the recipient only if doing so conforms with the acceptance rule for the recipient, thereby permitting electronic messages that exceed the electronic message size limit for the recipient to be successfully sent to the recipient.

11. The apparatus of claim 10, wherein the message from the recipient that the size of the electronic message exceeds the electronic message size limit for the recipient contains the electronic message size limit for the recipient, and wherein the electronic message is automatically divided into the at least two segments, each of which having a size that is less than the electronic message size limit for the recipient.

12. The apparatus of claim 11, wherein the at least one processor device is further operative to:
    record the electronic message size limit for the recipient in a database.

13. The apparatus of claim 12, wherein the at least one processor device is further operative to:
    consult the database prior to transmitting the electronic message from the sender to the recipient; and
    automatically divide the electronic message into the at least two segments, each of which having a size that is less than the electronic message size limit for the recipient recorded in the database.

14. An apparatus for sending an electronic message, the apparatus comprising:
    a memory; and
    at least one processor device, coupled to the memory, operative to:
        transmit the electronic message from a sender to a recipient, wherein a size of the electronic message exceeds an email size limit for the recipient;
        receive a message from the recipient that the size of the electronic message exceeds the electronic message size limit for the recipient;
        inquire as to a preference of the recipient for receiving electronic messages from the sender wherein the size of the electronic message exceeds the electronic message size limit for the recipient by sending a message to the recipient inquiring as to the preference of the recipient for receiving electronic messages from the sender when the size of the electronic message exceeds the electronic message size limit for the recipient;
        record i) the electronic message size limit for the recipient and ii) the preference of the recipient for receiving electronic messages from the sender wherein the size of the electronic message exceeds the electronic message size limit for the recipient in a database;
        establish an acceptance rule for the recipient, wherein the acceptance rule includes whether the recipient wants to receive electronic messages from the sender that exceed the electronic message size limit for the recipient and, if so, whether the recipient wants to receive electronic messages from the sender that exceed the electronic message size limit for the recipient just one time or every time the sender sends an electronic message to the recipient that exceeds the electronic message size limit for the recipient, and associating the acceptance rule with the recipient; and
        consult the database prior to transmitting the electronic message from the sender to the recipient; and
        automatically divide the electronic message into at least two segments, each of which having a size that is less than the electronic message size limit for the recipient recorded in the database and transmitting the at least two segments to the recipient if doing so conforms with the preference of the recipient thereby permitting electronic messages that exceed the electronic message size limit for the recipient to be successfully sent to the recipient, otherwise drop the electronic message.

15. The apparatus of claim 14, wherein the message sent to the recipient inquiring as to the preference of the recipient provides the recipient with an option i) to receive or ii) not to receive electronic messages from the sender when the size of the electronic message exceeds the electronic message size limit for the recipient.

16. The apparatus of claim 14, wherein the message sent to the recipient inquiring as to the preference of the recipient provides the recipient with an option to receive electronic messages from the sender when the size of the electronic message exceeds the electronic message size limit for the recipient either i) one time or ii) every time.

17. A computer program product for sending an electronic message, the computer program product comprising a computer readable storage medium having program instructions embodied therewith, the program instructions executable by a computer to cause the computer to:
- transmit the electronic message from a sender to a recipient, wherein a size of the electronic message exceeds an electronic message size limit for the recipient;
- receive a message from the recipient that the size of the electronic message exceeds the electronic message size limit for the recipient;
- establish an acceptance rule for the recipient, wherein the acceptance rule includes whether the recipient wants to receive electronic messages from the sender that exceed the electronic message size limit for the recipient just one time or every time the sender sends an electronic message to the recipient that exceeds the electronic message size limit for the recipient, and associating the acceptance rule with the recipient;
- consult the acceptance rule for the recipient prior to further transmissions from the sender to the recipient;
- automatically divide the electronic message into at least two segments, each of which has a size that is less than the electronic message size limit for the recipient; and
- transmit the at least two segments to the recipient only if doing so conforms with the acceptance rule for the recipient, thereby permitting electronic messages that exceed the electronic message size limit for the recipient to be successfully sent to the recipient.

* * * * *